United States Patent
Palaia

(10) Patent No.: US 6,474,676 B1
(45) Date of Patent: Nov. 5, 2002

(54) UNIVERSAL TOW BAR

(76) Inventor: Joe Palaia, HC2, Box 106E, Breezy Point, MN (US) 56472

( * ) Notice: Subject to any disclaimer, the term of this patent is extended or adjusted under 35 U.S.C. 154(b) by 0 days.

(21) Appl. No.: 09/853,194

(22) Filed: May 11, 2001

(51) Int. Cl.[7] .............................................. B62D 53/04
(52) U.S. Cl. ..................................... 280/502; 280/480
(58) Field of Search ................................ 280/480, 483, 280/493, 495, 500, 502, 402

(56) References Cited

U.S. PATENT DOCUMENTS

| | | | | |
|---|---|---|---|---|
| 2,289,730 A | * | 7/1942 | Roddel ........................ | 280/502 |
| 3,072,419 A | | 1/1963 | Safford ....................... | 280/406 |
| 3,806,162 A | * | 4/1974 | Milner ........................ | 280/502 |
| 3,888,516 A | | 6/1975 | Holt et al. .................. | 280/491 |
| 4,266,800 A | | 5/1981 | Hawkins ..................... | 280/491 |
| 4,577,883 A | | 3/1986 | Duncan ....................... | 280/491 |
| 4,614,354 A | | 9/1986 | Stagner ....................... | 280/415 |
| 4,861,061 A | | 8/1989 | Frantz ......................... | 280/479 |
| 4,958,847 A | | 9/1990 | Williams ..................... | 280/502 |
| 5,150,911 A | | 9/1992 | Williams ..................... | 280/502 |
| 5,429,382 A | | 7/1995 | Duncan ....................... | 280/491 |
| 5,516,140 A | | 5/1996 | Hinte .......................... | 280/494 |
| 5,915,715 A | | 6/1999 | Ford ........................... | 280/494 |

* cited by examiner

Primary Examiner—Kevin Hurley
Assistant Examiner—Matthew Luby
(74) Attorney, Agent, or Firm—Kinney & Lange, P.A.

(57) ABSTRACT

An apparatus for towing a vehicle having a bumper and a frame where the frame of the vehicle includes first and second towing features. The apparatus includes a frame having spaced apart first and second side members, and first and second securing members attached to the first and second side members. The first and second securing mechanism include hooks attached to straps. The hooks engage the towing features and the lengths of the straps are adjusted to secure the vehicle to the towing apparatus.

17 Claims, 5 Drawing Sheets

UNIVERSAL TOW BAR

BACKGROUND OF THE INVENTION

The present invention generally relates to a towing apparatus. More particularly, the present invention relates to a tow bar capable of towing all types of vehicles.

Previously, vehicles were towed by connecting two vehicles with a single chain. While the chain had enough strength to maintain a connection between the two vehicles, using a single chain for a towing mechanism caused several difficulties. First, two drivers were required to tow one vehicle, one driver operating the towing vehicle and one driver steering the towed vehicle. Second, the second driver was also required to provide braking to the towed vehicle when the towing vehicle slowed to prevent the front end of the towed vehicle from colliding with the back end of the towing vehicle. Additionally, because a single chain typically is positioned off-center on the towed vehicle, the driver of the towed vehicle would have to continuously compensate for the off center towing by the towing vehicle.

To overcome the inconvenience of needing two drivers and also eliminating the possibility of damaging the two vehicles by an inadvertent collision, tow bars were constructed of rigid members and fixedly attached to the frame of the towed vehicle as well as to a trailer hitch of the towing vehicle. Each tow bar was designed to be attached to a particular make and model of vehicle and therefore did not have the capability of towing all types of vehicles. Additionally, there was no shock absorbing mechanisms within the rigid tow bars therefore, when the towing car increased or decreased speed, the towed car would jolt the towing car, creating an uncomfortable ride.

Tow bars were further adapted to use chains to secure the towed vehicle to the tow bar. Chains allowed more vehicles to be towed by the same tow bar because hooks attached to the chains were used to engage the frame of the towed vehicle. A come-along was used to effectively shorten the chains and secure the towed vehicle to the tow bar. Although chains are effective in towing cars, chains are heavy and difficult to maneuver under vehicles. Additionally, chains provide no shock absorbing capabilities.

BRIEF SUMMARY OF THE INVENTION

The present invention includes an apparatus for towing a first vehicle having a bumper and a frame where the frame of the first vehicle includes first and second towing features. The apparatus includes a frame having spaced apart first and second side members having first and second securing mechanisms attached thereto. The first and second securing mechanisms include hooks attached to straps. The hooks engage the towing features and the lengths of the straps are adjusted to secure the first vehicle to the towing apparatus.

DETAILED DESCRIPTION

Figure 1:
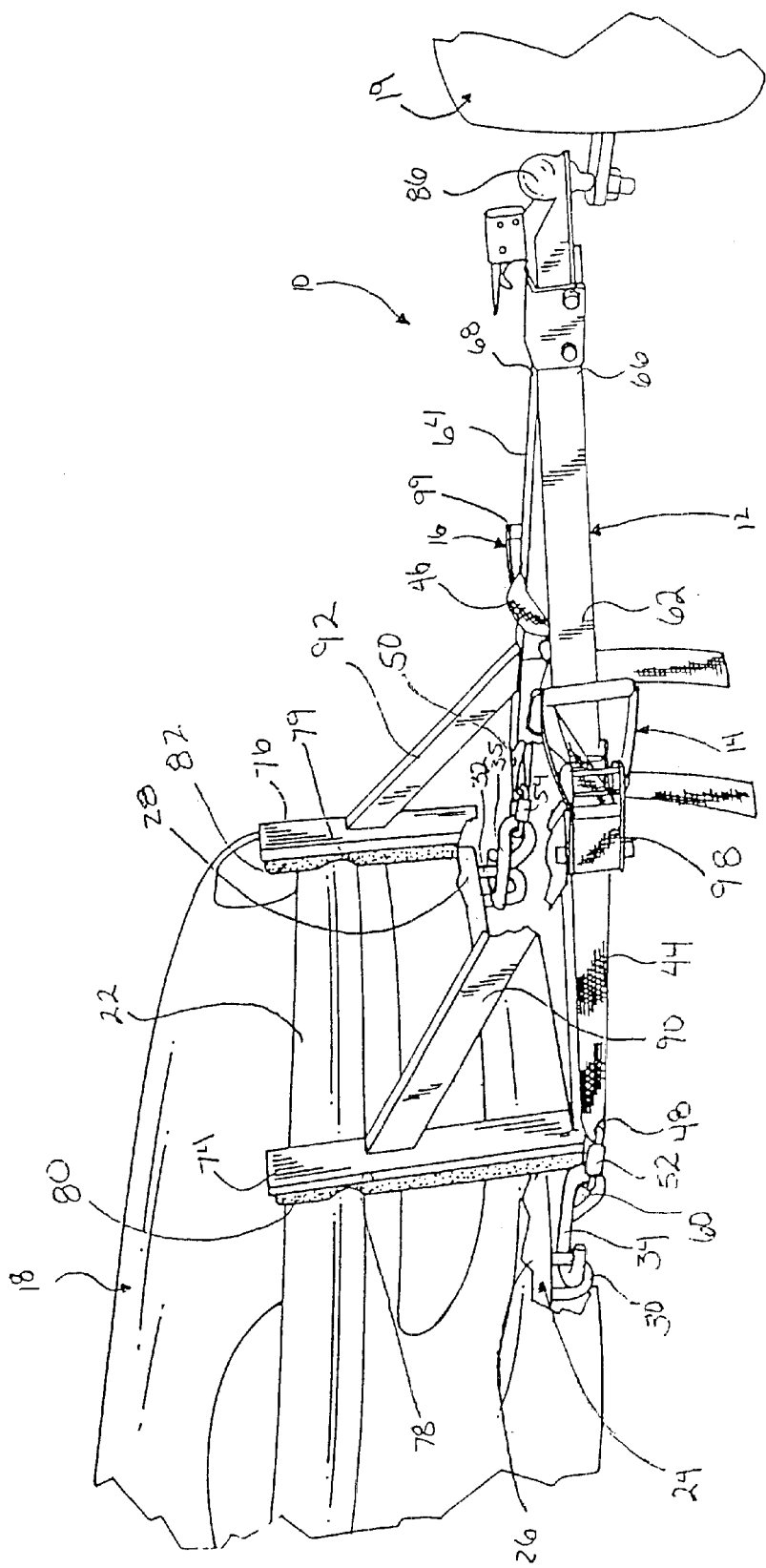
FIG. 1 is a partial cutaway perspective view of the present invention with J-shaped hooks engaging a frame of a vehicle.

A towing apparatus of the present invention is generally illustrated in FIG. 1 at 10. The towing apparatus 10 includes a frame 12 and first and second securing mechanisms 14, 16, respectively, which are operably attached to the frame 12 and universally attachable to a vehicle 18 to be towed.

The towing apparatus 10 of the present invention is designed to universally engage and tow any vehicle 18 having a bumper 22 and a frame 24. Typically, the frame 24 of a vehicle 18 includes two main members 26, 28 which extend along the length of a vehicle. Each of the two main members 26, 28 employ a towing feature 30, 32, either a loop or an aperture, for securing a hook to the frame 24. In this application, the towing features 30, 32, whether a loop or an aperture, will be given the same reference numbers. When the frame 24 includes first and second loops 30, 32 as the towing feature, J-shaped hooks 34, 35 are used to securely engage the loops 30, 32 as illustrated in FIG. 1.

Figure 4:
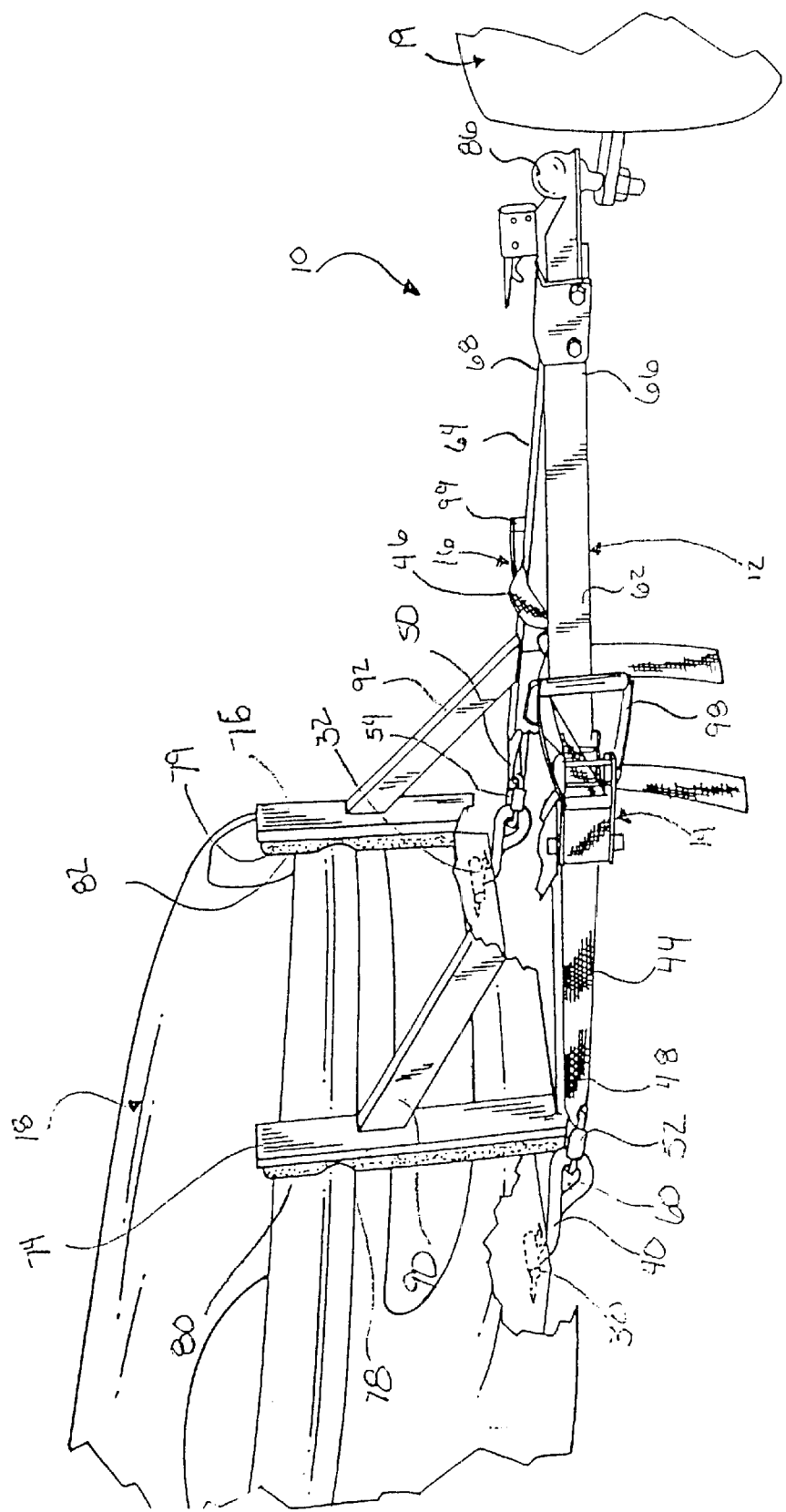
FIG. 4 is a partial cutaway perspective view of the present invention with T-shaped hooks engaging a frame of the vehicle.

When the main member 26, 28 includes apertures 30, 32 as the towing features, either the J-shaped hook 34, 35 can be used to securely engage the frame 24 or when the aperture, 30, 32 are slots, T-shaped hooks 40, 42 are used to securely engage the apertures 30, 32 as illustrated in FIG. 4.

The vehicle 18 to be towed is secured to the towing apparatus 10 by the first and second securing mechanisms 14, 16. The first and second securing mechanisms 14, 16 each include a strap 44, 46 having one end coiled about a spool and a free end 48, 50, respectively. The free end 48, 50 includes a loop which is used to secure the J-shaped hooks 34, 35 or the T-shaped hooks 40, 42 to the strap 44, 46 with a clasp 52, 54, respectively.

Figure 5:
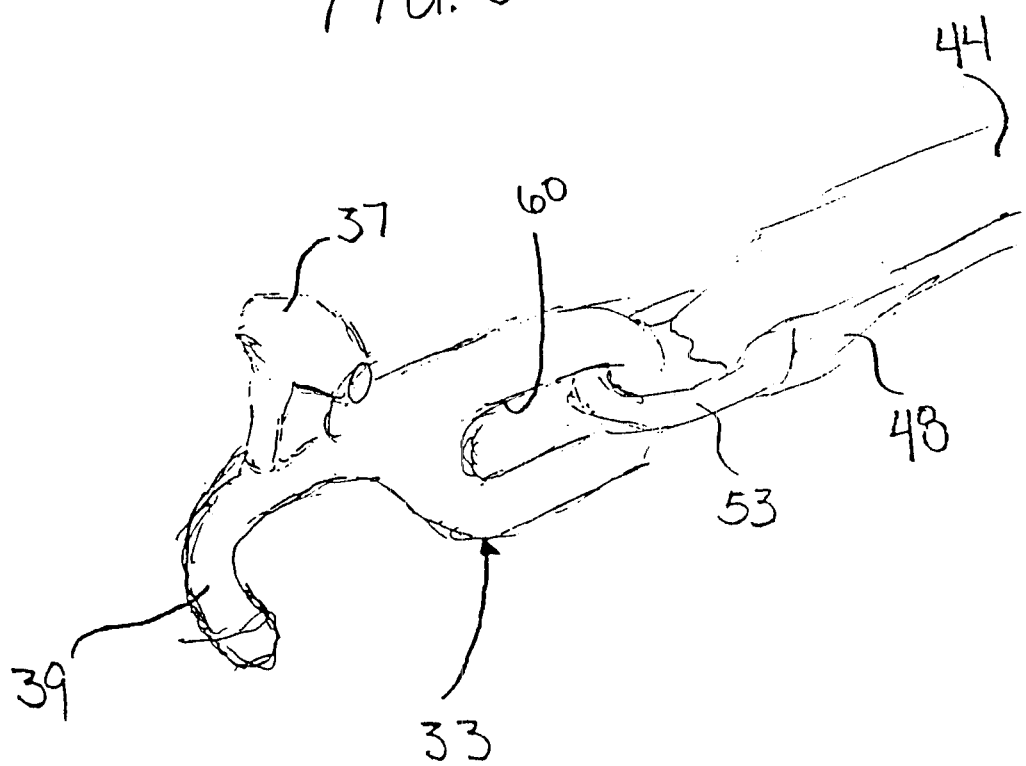
FIG. 5 is a perspective view of a combination T and J-shaped hook of the present invention.

Alternatively and preferably, a combination T and J-shaped hook 33 as illustrated in FIG. 5 is attached to end 48 of strap 44 with a clasp 53. The combination hook 33 includes a T-shaped feature 37 and a J-shaped feature 39. The combination T and J-shaped hook 33 eliminate the need for two separate hooks and allows one hook to engage either towing feature 30, 32 without exchanging hooks. Additionally, the clasp 53 is welded at the ends which prevents the hook from being misplaced or lost.

Although the combination hook 33 is preferred, either the J-shaped hooks 34, 35 or the T-shaped hooks 40, 42 attached to the straps 44, 46 by a threaded clasps 52, 54 all respectively, are within the scope of the invention. The clasps 52, 54 are generally C shaped where a first end of the C shaped clasp is threaded. Threaded nuts are slidably secured to second ends of the C shaped clasp by an outwardly extending flange around the circumference of the second end cooperating with a swage around an end of the nut thereby allowing the nut to slidably engage the clasp. Each hook 34, 35, 40, 42 includes a loop 60 which engages the clasp 52, 54. Each clasps 52, 54 also engages a loop at the free end 48, 50 of the straps 44, 46, respectively such that the clasp 52, 54 joins a pair of the J-shaped hooks 34, 35, or the T-shaped hooks 40, 42 and the straps 44, 46, respectively. The nuts threadably engage the first ends of the clasps 52, 54 to secure a pair of the J-shaped hooks 34, 35 or the T-shaped hooks 40,42 to the straps 44, 46, respectively.

The first and second securing mechanisms 14, 16 are attached to first and second side members 62, 64 of the frame 12. The first and second side members 62, 64 are proximate each other at a first end 66, 68 and spaced apart at second ends 70, 72 such that the frame 12 is generally in the shape of an A. A frame 12 in the shape of an A is preferred because the A-shaped configuration allows a towing vehicle 19 to turn sharply without contacting a back bumper with the frame 13. Although an A-shaped frame is preferred, other frame configurations are within the scope of the invention. The first and second side members 62, 64 are preferably constructed of a 1"×2" tubular metal piece. The tubular metal piece preferably is constructed of steel or aluminum although other materials of construction are within the scope of the invention.

A first vehicle engaging member 74 is attached to the second end 70 of the first side member 62 at a bottom end of the first vehicle engaging member 74. Preferably, the first vehicle engaging member 74 is welded to the second end 70 of the first side member 62 in a substantially perpendicular alignment of the horizontal and vertical planes. The first vehicle engaging member 74 is preferably constructed of a solid piece of metal of the same metallurgy as the first side member 62.

Similarly, a second vehicle engaging member 76 is attached to the second end 72 of the second side member 16 at a bottom end of the second vehicle engaging member 76. Preferably the second vehicle engaging member 76 is constructed of a solid piece of metal having the same metallurgy as the second side member 16. The second vehicle engaging member 76 is substantially parallel to the first engaging member 74.

A portion of protective material 80, 82 is attached to an engaging surface 78, 79 of both the first and second vehicle engaging members 74, 76, respectively. The portions protective material 80, 82 make contact with the bumper 22 of the vehicle 18 to be towed. The protective material 80, 82 is compressible and molds to the configuration of the bumper 22 as illustrated in FIGS. 1 and 4. The material 80, 82 prevents the tow bar 10 from damaging the vehicle 18 to be towed. Additionally, the protective material 80, 82 provides shock absorption while a towing vehicle 19 is slowed by further compressing the portions of protective material 80, 82. Preferably, the protective material 80, 82 is a closed cell neoprene sponge rubber foam although other materials that do not damage the towed vehicle are within the scope of the invention. The protective material can be purchased from illbruck, Inc. located in Minneapolis, Minn. having material designation SN-450.

In operation, the tow bar 10 is attached to the towing vehicle 19 at the first end of the frame 12. Preferably, the tow bar 10 is attached to the towing vehicle 19 with a ball hitch 86 which is known in the art. Although a ball hitch 86 is preferred, one skilled in the art will recognize that other attaching mechanisms such as a hitch and a draw bar are also within the scope the invention.

The tow bar 10 is positioned near and centered on the bumper 22 of the vehicle 18 to be towed. The tow bar 10 should be centered on the vehicle 18 to be towed so that the vehicle 18 to be towed does not pull to one side or the other in transit.

For purposes of illustration, the attachment of the tow bar 10 to the vehicle 18 will describe the use of the J-shaped hooks 34, 35. The hooks 34, 35 of each securing mechanism 14, 16 are positioned within the towing feature 30, 32 in the frame of the vehicle 18 to be towed. A racheting mechanism 86, 88 which is attached to the spool is manipulated to shorten the length of the straps 44, 46 to apply a force to the to the vehicle 18 to be towed. A pawl within the racheting mechanism 86, 88 prevents the spool from reversing direction when a force is applied to the vehicle 18 to be towed.

The force applied to the frame 24 of the vehicle to be towed 18 forces the first and second engaging members 74, 76 to contact the bumper 22 of the vehicle 18 to be towed. Once the engaging members 74, 76 are in contact with the bumper 22 of the vehicle 18, additional shortening of the straps 44, 46 compresses and molds the protective material 80, 82 to the bumper 32 and secures the vehicle 18 to be towed between the engaging members 74, 76 and the J-shaped hooks 34, 35, and straps 44, 46. Maintaining a force between the J-shaped hooks 34, 35, and straps 44, 46 and the vehicle engaging members 74, 76 prevents the towed vehicle 18 from swaying relative to the tow bar 10, thereby providing a stable towing connection between the towing vehicle and the vehicle 19 to be towed 18.

Figure 2:
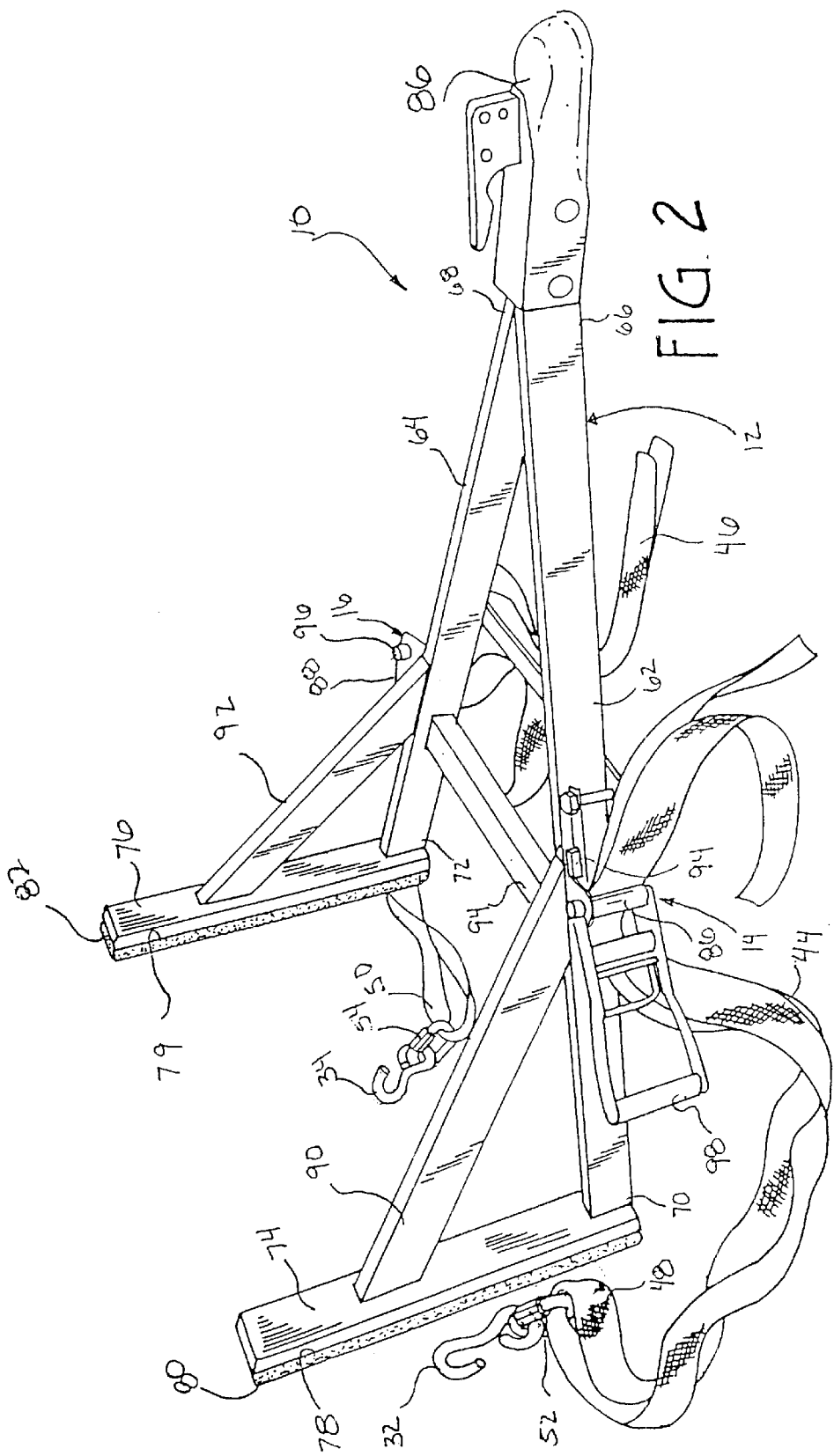
FIG. 2 is a perspective view of the present invention having J-shaped hooks.
Figure 3:
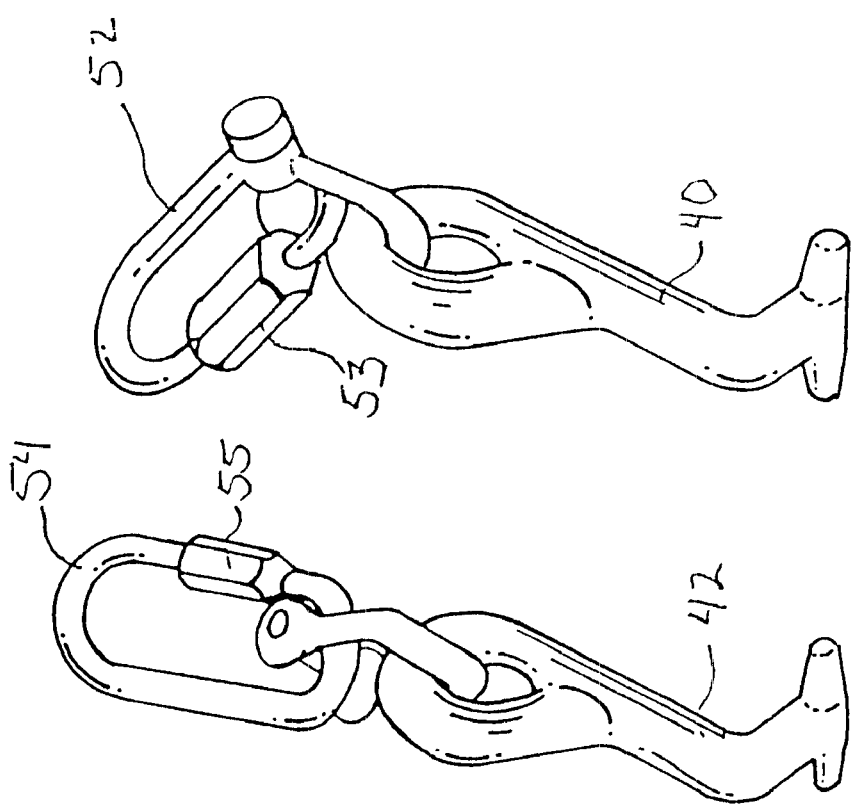
FIG. 3 is a perspective view of a pair of T-shaped hooks of the present invention.

To prevent the engaging members 74, 76 from bending because of the forces created by the straps 44, 46, first and second angled braces 90, 92 extend from the first and second side members 62, 64 and attach to the first and second vehicle engaging members 74, 76, respectively, preferably by a weld. The first and second angled braces 90, 92 provide support to the first and second vehicle engaging members 74, 76 such that the first and second vehicle engaging members 74, 76 have the structural integrity to withstand a forward force created by the towed vehicle 18 when the towing vehicle 19 is brought to a rapid stop as well as withstand the force created by the straps 44, 46. One skilled in the art will realize that the first and second angled braces 90, 92 are positioned as mirror images of each other along a lengthwise central axis. Additionally, a cross-bar 94 is welded to the first and second side members 62, 64 to provide support to maintain the second ends 70, 72 apart by a selected distance as best illustrated in FIG. 2

One skilled in the art will also recognize that the straps 44, 46 of the universal tow bar 10 of the present invention retain the vehicle 18 to be towed proximate the engaging members 74, 76. Therefore, the straps 44, 46 must be able to withstand at least the weight of the vehicle to be towed 18 with some margin of safety. Preferably, each strap 44, 46 is rated for 3,300 pounds. Additionally, the straps 44, 46 stretch slightly, therefore when the towing vehicle 19 increases in speed the stretch in the straps 44, 46 absorbs some of the shock before returning to the desired length. Therefore, the portions of protective material 80, 82 and the straps 44, 46 provide the towing apparatus 10 of the present invention with shock absorbing capabilities which provide a smoother ride for persons operating and riding in a towing vehicle 19 than tow bars in the prior art.

Once the vehicle 18 has been towed to a desired location, the universal tow bar 10 is easily removed from the towed vehicle 18 by manipulating buttons 94, 96 proximate the handles 98, 99 of the racheting mechanisms 86, 88. The button 94, 96 positions the pawl away from a gear such that the rotation of the spool can be reversed thereby allowing the length of the strap 44, 46 to increase and allowing the J-shaped hooks 34, 35 to be removed from the towing feature 30, 32. Once the J-shaped hooks 34, 35 are removed from the towing feature 30, 32, the universal tow bar 10 can be displaced from the towed vehicle 18 by moving the towing vehicle 18 from the towed vehicle 18.

Although the present invention has been described with reference to preferred embodiments, workers skilled in the art will recognize that changes may be made in form and detail without departing from the spirit and scope of the invention.

What is claimed is:

1. An apparatus for towing a first vehicle, the first vehicle having a bumper and a frame which includes first and second towing features, the apparatus comprising:

a frame comprising spaced apart first and second side members wherein a first end of the frame engages a second vehicle;

a first securing mechanism comprising a first strap and a first hook attached to the strap, the first securing mechanism attached to the first side member wherein the first hook engages the first towing feature of the frame of the first vehicle; and a second securing mechanism comprising a second strap and a second hook, the second hook attached to the second strap wherein the second hook engages the second towing feature of the frame of the first vehicle wherein the first and second securing apparatus retract the first and second straps such that the tow bar securely attaches to the first vehicle.

2. The apparatus of claim 1 wherein the frame comprises an A shape wherein the first ends of the first and second side members are proximate each other and second ends of the first and second side members are spaced apart.

3. The apparatus of claim 1 and further comprising:

a first vehicle engaging member attached to the second end of the first side member of the frame, the first vehicle engaging member engaging the bumper of the first vehicle; and a second vehicle engaging member attached to the second end of the second side member of the frame, the second vehicle engaging member engaging the bumper of the first vehicle.

4. The apparatus of claim 3 and further comprising a protective material attached to a vehicle engaging surface of both the first and second engaging members such that the first and second engaging surfaces do not damage the vehicle being towed.

5. The apparatus of claim 4 wherein the protective material comprises compressive material.

6. The apparatus of claim 1 wherein the first and second hooks comprise a combination J and T-shaped hook.

7. The apparatus of claim 6 wherein the first and second securing apparatus each comprise;

a spool; and a racheting mechanism operably engaging the spool wherein the racheting mechanism manipulates the spool to shorten the length of the strap.

8. The apparatus of claim 2 wherein a support member attaches to the first and second side members between the first and second ends.

9. The apparatus of claim 2 wherein a ball engaging portion of a ball hitch attaches to the first end of the A frame.

10. A universal towing apparatus for towing all vehicles with a bumper and a frame having a first beam having a first towing feature and a second beam having a second towing feature, the universal towing apparatus comprising:

a frame comprising first and second side members, the side members having first ends positioned proximate a towing vehicle and second ends positioned proximate the vehicle to be towed wherein the second ends are positioned apart from each other;

a first engaging member attached to the second end of the first side member, the first engaging member engaging the bumper of the vehicle;

a second engaging member attached to the second end of the second side member, the second engaging member engages the bumper of the vehicle;

a first securing apparatus comprising a first strap and a first hook wherein the first securing apparatus is attached to the first side member and wherein the first hook, attached to a free end of a first strap, engages the first towing feature of the first beam; and a second securing apparatus comprising a second strap and a second hook wherein the second securing apparatus is attached to the second side member and wherein the second hook, attached a first end of a second strap, engages the second towing feature of the second beam wherein lengths of the first and second straps are adjusted to retain the vehicle adjacent to the first and second engaging members.

11. The apparatus of claim 10 wherein the frame comprises an A shape wherein the first ends of the first and second side members are proximate each other and the second ends of the first and second side members are spaced apart.

12. The apparatus of claim 10 and further comprising a protective material attached to a vehicle engaging surface of both the first and second engaging members such that the protective material contacts the vehicle being towed when the towing apparatus is secured to the vehicle being towed.

13. The apparatus of claim 12 wherein the protective material comprises a compressive material.

14. The apparatus of claim 10 wherein a hook comprises a combination and T-shaped hook.

15. The apparatus of claim 14 wherein the first and second securing apparatus each comprise:

a spool; and a racheting mechanism operably attached to the spool wherein the racheting mechanism manipulates the spool to retract a length of the strap thereby applying a force to the vehicle to be towed which secures the first and second vehicle engaging members to the bumper of the vehicle to be towed.

16. The apparatus of claim 11 and further comprising a support member attached to the first and second side members between the first and second ends.

17. The apparatus of claim 11 and further comprising a ball engaging portion of a ball hitch attached to the first end of the A frame.

* * * * *